United States Patent
Saliba

(10) Patent No.: US 12,158,951 B2
(45) Date of Patent: Dec. 3, 2024

(54) SYSTEM AND METHOD FOR GENERATING A MINIMAL FORENSIC IMAGE OF A DATASET OF INTEREST

(71) Applicant: Magnet Forensics Inc., Waterloo (CA)

(72) Inventor: Jad John Saliba, Waterloo (CA)

(73) Assignee: Magnet Forensics Inc., Waterloo (CA)

( * ) Notice: Subject to any disclaimer, the term of this patent is extended or adjusted under 35 U.S.C. 154(b) by 335 days.

(21) Appl. No.: 17/384,877

(22) Filed: Jul. 26, 2021

(65) Prior Publication Data

US 2022/0027466 A1 Jan. 27, 2022

Related U.S. Application Data

(60) Provisional application No. 63/056,261, filed on Jul. 24, 2020.

(51) Int. Cl.
*G06F 21/55* (2013.01)

(52) U.S. Cl.
CPC .................. *G06F 21/554* (2013.01)

(58) Field of Classification Search
CPC .................................................. G06F 21/554
See application file for complete search history.

(56) References Cited

U.S. PATENT DOCUMENTS

| | | | |
|---|---|---|---|
| 2005/0235154 A1* | 10/2005 | Serret-Avila | G06F 21/53 713/176 |
| 2009/0288164 A1 | 11/2009 | Adelstein et al. | |
| 2016/0080397 A1* | 3/2016 | Bacastow | H04L 63/1433 726/1 |
| 2017/0300594 A1 | 10/2017 | Cosentino et al. | |

(Continued)

FOREIGN PATENT DOCUMENTS

| | | | | |
|---|---|---|---|---|
| CN | 104426710 A | * | 3/2015 | |
| CN | 106412093 A | * | 2/2017 | .............. H04L 67/06 |
| WO | WO-2016101006 A1 | * | 6/2016 | ....... G06F 17/30843 |

OTHER PUBLICATIONS

Monali P. Mohite • Jyoti Y. Deshmukh • Pallavi R. Gulve; Qualitative and quantitative analysis of cloud based digital forensic tool; 2016 10th International Conference on Intelligent Systems and Control (ISCO) (2016, pp. 1-5); (Year: 2016).*

Saad Alqahtany • Nathan Clarke • Steven Furnell • Christoph Reich; A forensic acquisition based upon a cluster analysis of non-volatile memory in IaaS; 2017 2nd International Conference on Anti-Cyber Crimes (ICACC) (2017, pp. 123-128); (Year: 2017).*

(Continued)

*Primary Examiner* — Luu T Pham
*Assistant Examiner* — Chao Wang
(74) *Attorney, Agent, or Firm* — Own Innovation; Kent C. Howe; James W. Hinton

(57) ABSTRACT

What is provided is a method of generating a minimal forensic image of a target dataset to reduce upload demand. The method includes storing a set of criteria in an investigator device, wherein the set of criteria determines target data files of the target dataset which are to be included in the minimal forensic image, and wherein the set of criteria includes a plurality of file types and at least a first upload format for each file type in the plurality of file types, locating the target data files of the plurality of file types in the target dataset using the set of criteria, storing a representation of each target data file in the minimal forensic image in an MFI upload format determined according to the set of criteria, and transferring the minimal forensic image to a cloud server.

12 Claims, 7 Drawing Sheets

(56) References Cited

U.S. PATENT DOCUMENTS

2019/0068916 A1\* 2/2019 Arora ................ H04N 1/00
2019/0132348 A1\* 5/2019 Ng ................ H04L 9/3242

OTHER PUBLICATIONS

Xiaoyu Du • Paul Ledwith • Mark Scanlon; Deduplicated Disk Image Evidence Acquisition and Forensically-Sound Reconstruction; 2018 17th IEEE International Conference On Trust, Security And Privacy In Computing And Communications/ 12th IEEE International Conference On Big Data Science And Engineering; (Year: 2018).\*
European Patent Office, Extended European Search Report for EP Patent App. No. 21020385.7, Dec. 3, 2021.
Schatz, "AFF4-L: A Scalable Open Logical Evidence Container", Digital Investigation 29 (2019), S143-S149.

\* cited by examiner

SYSTEM AND METHOD FOR GENERATING A MINIMAL FORENSIC IMAGE OF A DATASET OF INTEREST

TECHNICAL FIELD

The embodiments disclosed herein relate generally to digital forensics, and, in particular to systems and methods for targeted transfer of files and data from large forensic datasets.

BACKGROUND

In digital forensics there is often a need to transfer or copy files from a device of interest, such as a device of a suspected wrongdoer, to an investigator device or storage device quickly and efficiently for analysis and investigation. However, the device of interest may include a dataset, such as an entire hard drive, so large as to prohibit efficient transfer all possible files of interest. Currently available upload speeds are insufficient to handle the task of acquiring, for example, terabytes of data quickly enough to initiate forensic investigations, even with current compression algorithms. This is especially detrimental in forensic investigations which are time sensitive. This is particularly true in cases concerning a missing person or an imminent threat to public safety.

Accordingly, there is a need for systems and methods which allow for quick targeted acquisition of those files and data which are most valuable to the digital forensic investigation and which can allow a forensic investigator to initiate the digital forensic investigation in a timely manner.

SUMMARY

A method of generating a minimal forensic image of a target dataset to reduce upload demand is provided. The method includes storing a set of criteria in an investigator device. The set of criteria determines target data files of the target dataset which are to be included in the minimal forensic image. The set of criteria includes a plurality of file types and at least a first upload format for each file type in the plurality of file types. The method further includes locating the target data files of the plurality of file types in the target dataset using the set of criteria. The method further includes storing a representation of each target data file in the minimal forensic image in an upload format determined according to the set of criteria. The method further includes transferring the minimal forensic image to a cloud server.

The method may further include configuring the set of criteria by the investigator device.

An MFI (minimal forensic image) upload format of at least one file type in the plurality of file types may be a complete file.

An MFI upload format of at least one file type in the plurality of file types may be a partial file.

An MFI upload format of at least one file type in the plurality of file types may be a cryptographic hash.

At least one file type of the plurality of file types may have at least a second upload format, wherein which of the first upload format and at least a second upload format is used in the minimal forensic image is determined based on a characteristic of the respective target data file.

The upload format of the target data files of at least one file type of the plurality of file types may be determined by a threshold file size value, wherein at or below the threshold file size value a complete file is transferred to the cloud server and above the threshold file size value a partial file is transferred to the cloud server.

The at least one file type may be a document file and the threshold file size value may be within a range of 100 kb to 300 kb.

The partial file may be a text file.

The at least one file type may be a picture file and the threshold file size value may be within a range of 100 kb to 300 kb.

The partial file may be a thumbnail of the picture file.

The at least one file type may be a video file and the threshold file size may be within a range of 1 MB to 2 MB.

The partial file may be a subset of the frames of the video file.

The method may further include compressing the data of at least a subset of the target data files before transferring.

The method may further include automatically generating a content list of the transferred target data files including at least identifying information and the upload format of each target data file and storing the content list in the minimal forensic image.

The minimal forensic image may further include a full file listing of the target dataset of the target device, the full file listing including metadata for each file in the target dataset.

The method may further include uploading secondary data to the cloud server after the minimal forensic image is generated, wherein the secondary data is any data of the target dataset which was not included in the minimal forensic image.

A system for generating a minimal forensic image (MFI) of a target dataset of a target device to reduce upload demand is also provided. The system includes: a cloud server to store the minimal forensic image; a target device including a memory storing a target dataset; and an investigator device. The investigator device includes a processor communicatively coupled to a memory. The investigator device is configured to: store a set of criteria for determining which target data files of the target dataset will be included in the minimal forensic image, wherein the set of criteria includes a plurality of file types and at least a first upload format for each file type in the plurality of file types; locate target data files of the plurality of file types in the target dataset using the set of criteria; transfer the target data files to the cloud server; wherein transferring the target data files includes: storing a representation of each target data file in the minimal forensic image in an upload format determined according to the set of criteria; uploading the minimal forensic image to the cloud server.

The set of criteria may further include a hierarchy for the plurality of file types wherein target data files of at least a first file type of the plurality of file types are located and transferred before target data files of at least a second file type of the plurality of file types are located and transferred.

The system may be further configured to generate a content list of the transferred target data files including at least identifying information and the upload format of each target data file and storing the content list in the minimal forensic image.

The investigator device may be further configured to store in the MFI a full file listing of the target dataset of the target device, the full file listing including metadata for each file in the target dataset.

The set of criteria may further include instructions for uploading secondary data to the cloud server after the minimal forensic image is generated, wherein secondary data is any data of the target dataset which was not included in the minimal forensic image.

A method of generating a minimal forensic image (MFI) of a target dataset stored on a target device to reduce upload demand and facilitate faster initiation of digital forensic investigation is also provided. The method includes storing a set of MFI inclusion criteria in memory. The set of MFI inclusion criteria includes a plurality of file types and upload criteria for each file type. The upload criteria includes an upload format indicating a format in which a file of the respective file type is to be added to the MFI. The method further includes automatically scanning the target dataset according to the set of MFI inclusion criteria. The scanning includes, for a target file in the target dataset: determining a file type identifier of the target file; determining the upload format of the target file from the MFI inclusion criteria using the file type identifier; and storing a file representation of the target file in the minimal forensic image in the upload format. The method further includes initiating a data transfer of the MFI to a cloud server.

The MFI inclusion criteria may further include a file location, and automatically scanning the target dataset according to the set of MFI inclusion criteria may further include identifying files in the target dataset at the file location and storing a file representation of each of the identified files from the file location in the MFI.

The method may further include storing a complete file list of the target dataset in the MFI, wherein the complete file list includes metadata for each file in the target dataset.

The metadata may include any one or more of a folder structure, a file path, and a file name.

The method may further include storing an MFI content list in the MFI and automatically generating a record in the MFI content list for each file representation in the MFI, the record including a file type identifier and the upload format.

The upload format may be a reduced size representation of the file, and the method may further include generating the reduced size representation of the file.

The reduced size representation may be a hash of the file.

Determining the upload format of the file may further include: determining whether a file size of the target file exceeds a threshold file size; if the file size exceeds the threshold file size, generating a reduced size representation of the target file and storing the reduced size representation of the target file in the MFI; and if the file size does not exceed the threshold file size, storing the target file in a full file format in the MFI.

The method may further include determining the target file is not to be included in the MFI by checking a hash of the target file against a reference hash.

The reference hash may be of an operating system file or a program application file.

The method may further include automatically logging the hash of the target file along with respective location information.

The reference hash may be of a previously scanned target file of the target dataset that has been stored in the MFI, and the method may further include determining the target file is not to be included in the MFI when the hash of the target file matches the reference hash.

The method may further include generating a link in the MFI to the file representation of the previously scanned target file.

The MFI may comprise a digital forensic container.

The method may further include storing, in the MFI, metadata for each file in the target dataset, the metadata including at least a file type identifier and a file location on the target device.

The upload format may be selected from a group consisting of: a complete representation of the file, a reduced size representation of the file, and no representation of the file.

The file may be a media file and generating the reduced size representation of the file may include capturing a subset of media data in the media file and generating a hash of the file.

The reduced size representation may include a partial representation of the file and a hash of the file.

Determining the file type identifier may include scanning a file listing stored on the target device, the file listing including file metadata for a plurality of files in the file listing, the file metadata including a file type identifier and a file size for each of the plurality of files.

Automatically scanning the target dataset according to the set of MFI inclusion criteria may further include reading through file system information of the target dataset stored on the target device.

The MFI inclusion criteria may include source location information identifying a file location on the target device, and the method may further include automatically retrieving and storing files from the file location.

The method may further include modifying the MFI inclusion criteria according to user input data received via a user interface prior to automatically scanning the target dataset:

Modifying the MFI inclusion criteria may include adding a new criterion to the MFI inclusion criteria, the new criteria including at least one of a file type, a file location, a file hash match, a specified time range for a file event, and a maximum file size.

The file event may be creation of a file, modification of a file, or access of a file.

The MFI inclusion criteria may include a core system file type, and the upload format may be a complete file.

The core system file type may describe user-related or system-related activity.

A method of prioritized uploading of forensically relevant data from a target dataset stored on a target device is also provided. The method includes generating a minimal forensic image of the target dataset using an investigator device. The method further includes generating a complete forensic image of the target dataset using the investigator device. The method further includes initiating an upload of the minimal forensic image and an upload of the complete forensic image from the investigator device to a cloud server. The method further includes prioritizing the upload of the minimal forensic image over the upload of the complete forensic image.

Prioritizing may include uploading data from the complete forensic image only when such uploading does not reduce the upload speed of the minimal forensic image.

The method may further include receiving a user input via a user interface indicating a priority file of which a reduced size representation has been transferred to the cloud server in the minimal forensic image and prioritizing an upload of a complete representation of the priority file from the complete forensic image over the remaining files in the complete forensic image.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification.

DETAILED DESCRIPTION

Figure 1:
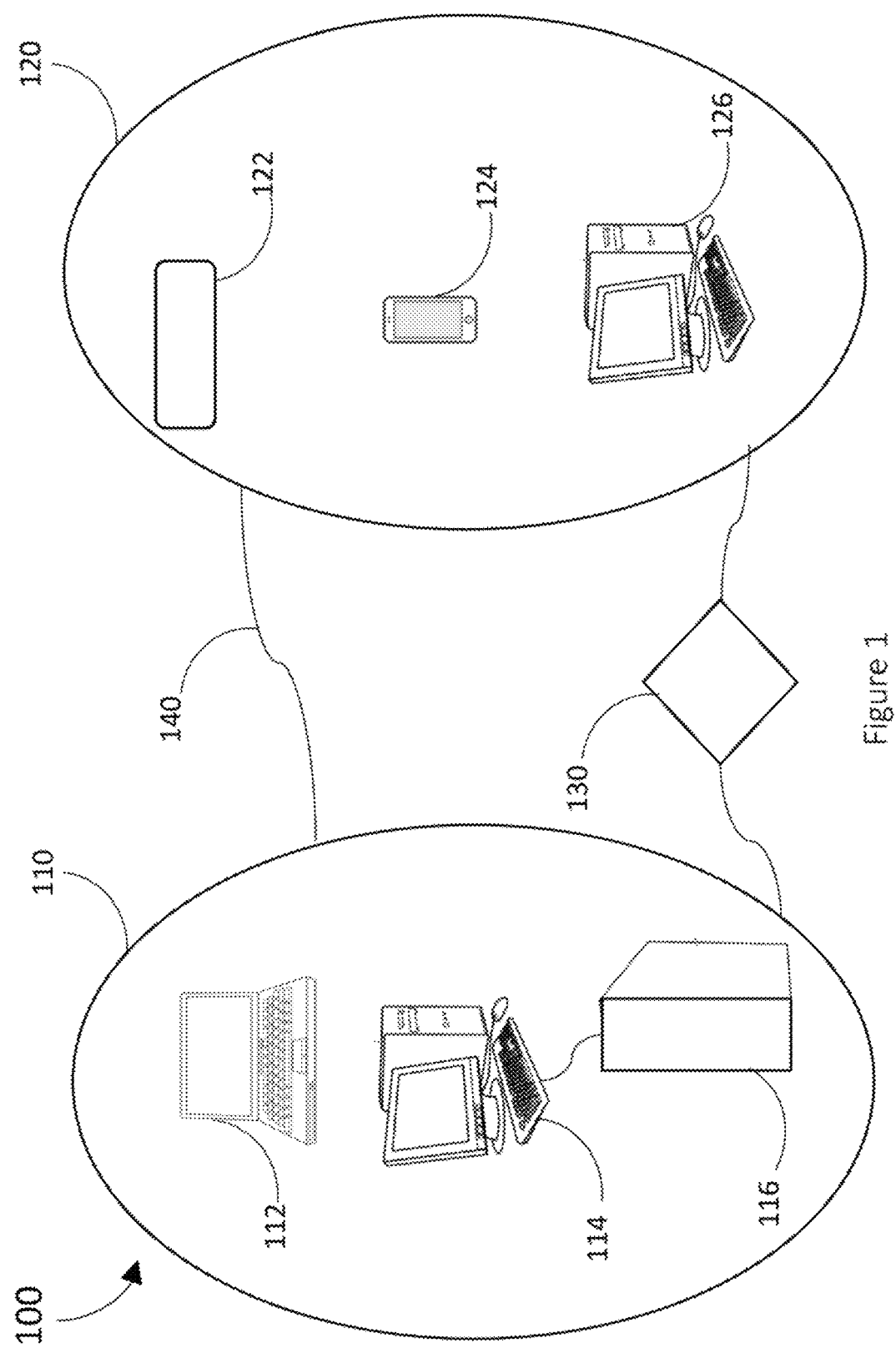
FIG. 1 is a schematic diagram of a system for creating a minimal forensic image of a target dataset of a target device, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Any range of numerical values presented herein is inclusive of the endpoints of the range. For example, "within a range of 100 kb to 300 kb" is inclusive of 100 kb and 300 kb.

In a digital forensics workflow, the process of locating and acquiring digital files of interest from a target device can be time consuming and delay the start of digital forensic analysis and investigation of such files. This is especially true in cases where files (i.e. copies of files) are being uploaded from the target device to the cloud for storage and analysis. Moving large amounts of data to a cloud server is especially time consuming as current internet speeds are not growing to keep up with the growth of datasets, which can be on the scale of terabytes. However, it can be highly advantageous to perform digital forensic workflows in the cloud instead of on premises for more robust and flexible investigations.

Copying entire datasets (e.g. byte-for-byte copies) from a target device for forensic investigation may require days, weeks, or even months depending on upload speed and size of the dataset of which a complete forensic copy, or "forensic image", is being made. The present disclosure advantageously provides systems and methods designed to decrease the amount of time it takes to search for incriminating files by pre-determining which types of files are of interest, and what information from those files is needed for evidentiary or investigatory purposes. To minimize upload time, a minimal forensic image ("MFI") is generated instead of a complete forensic image. The MFI comprises a subset of the target dataset which may include various upload formats such as complete files, cryptographic hashes, thumbnails, partial files, metadata, etc. The MFI uses various upload formats such as complete copies of files, cryptographic hashes, thumbnails, partial files, metadata, etc. in order to reduce the size of the dataset being transferred and reduce upload time. By quickly uploading only a subset of the data on the target device which is of particular importance in starting forensic investigation and analysis, forensic investigations, including those performed within a cloud environment, can be made more efficient.

The present systems and methods may be used to more quickly scan devices such as smartphones, computers, hard drives, cloud storage, and the like to determine if forensically relevant material is present (e.g. illicit or prohibited material). From there, a risk profile can be quickly developed. This reduces demand on digital forensic units by limiting upload and storage demands and therefore the time necessary to perform forensic investigation. Further, the present systems and methods provide a means by which a forensic investigator can retrieve enough data from a target device to initiate an investigation.

As an example, Child Exploitation investigators need the fastest tools in their arsenal to be able to locate illegal material and get to the evidence as quickly as possible. Fast triaging of forensically relevant data can help the forensic investigator determine which devices to seize for a forensic examination. This can be important in cases such as executing a search warrant at a suspect's home or determining if a paroled offender has breached their release conditions.

The present disclosure may refer to certain "files" of the target dataset being included (i.e. added to and stored in) in a minimal forensic image. In such cases, it is understood that "files" refers to some representation of the file (i.e. a file representation) and not the actual file. The file representation may be, for example, a complete copy (e.g. byte for byte copy), a partial copy or reduced size representation (e.g. a thumbnail of a picture file, key frames of a video file, text of a document file), or a hash of the file. Accordingly, it is to be understood that the systems, methods, and devices described herein include certain components that are configured to perform certain operations to generate the file representation of the target dataset file. This may include software components for generating a byte-for-byte copy of a file, generating a reduced size representation of a file (e.g. software components configured to perform any one or more of capturing a thumbnail of a picture file, capturing a certain number of key frames of a video file, extracting text from a document file, etc.), or generating a cryptographic hash of the file (e.g. a hashing function).

The present disclosure may refer to instances in which an investigator or user "creates" criteria that is used by the system to determine what is included in the MFI. This may include the investigator modifying or adding criteria, such as through the input of data via a user interface. It is to be understood that in such instances of "creating" criteria, other embodiments are contemplated in which the criteria may be "pre-established" such that the system can determine what to include from the target dataset in the MFI without a user input modifying or adding to the criteria.

Referring now to FIG. 1, illustrated therein is a schematic diagram of a system 100 for creating a minimal forensic image of a target dataset of a target device, according to an embodiment. System 100 includes an investigator device 110, a target device 120, and a cloud server 130. Investigator device 110 and target device 120 are communicatively connected to cloud server 130 via data communication link 150a, 150b, respectively (referred to generically as data communication link 150). Investigator device 110 and target device 120 are communicatively connected to each other by communicative connection 140.

The investigator device 110 may include at least one computing device having a memory and a processor configured to execute instructions for creating a minimal forensic image of a target dataset of the target device 120 and uploading the minimal forensic image to the cloud server 130 via the data communication link 150. Examples of investigator devices include a laptop computer 112 and a desktop computer 114. The desktop computer 114 may be connected to a server 116.

In various embodiments, the investigator device 110 may establish a communicative connection 140 to the target device 120 by a wireless connection or wired connection. The wired connection may be a data transfer cable, such as a USB cable or the like.

The investigator device 110 may be powered by an operating system such as Windows 10, Android, iOS, or the like.

The target device 120 may be any device capable of storing data and files. The target device 120 stores a target dataset of forensically relevant data and/or files. The target device 120 may be, for example, a hard drive 122, a mobile device 124, or a desktop computer 126. In various embodiments, the target device 120 may be a seized device (e.g. seized from a suspect) or a corporate device (e.g. a corporate laptop of an employee). The target device 120 may be a cloud computing device, such as a cloud server.

The investigator devices 110 and target devices 120 shown in FIG. 1 and discussed herein represent various embodiments of systems for creating a minimal forensic image of a target dataset. That is, a single investigator device 110 or multiple investigator devices 110 may be directly or indirectly connected to target devices 120 to scan a target device dataset for files of interest, or "target data files", to be included in the minimal forensic image. The investigator device 110 stores a set of criteria for determining which file types to include in the MFI and in what upload format. In some cases, the set of criteria stored in the investigator device 110 may be determined (e.g. modified), at least in part, via an input of a user of the investigator device 110. The input may be received via a user interface executing on the investigator device 110. The investigator device 110 scans the target device files according to the stored criteria to find the target data files to be included in the minimal forensic image and stores them in their respective upload formats in the MFI.

The cloud server 130 may be a single server or multiple servers. The cloud server 130 is configured to process and store the minimal forensic image. The cloud server 130 may further include forensic analysis software for processing and analyzing data transferred to the cloud server 130 in the MFI. The cloud server 130 may be connected to a cloud database for storing forensic data, such as data uploaded from the target device 120 to the cloud server 130 using the MFI.

In other embodiments, the investigator device 110 may be communicatively connected to a non-cloud storage device and the minimal forensic image may be stored in the non-cloud storage device. That is, in such embodiments the digital forensic investigation may be performed without the use of cloud computing.

Examples of the types of data and/or files that may be stored in the minimal forensic image include, but are not limited to: a full file listing of the target dataset including metadata of some or all files, picture files, video files, documents, and internet browser history. For a particular investigation, a set of criteria is used by the investigator device 110 to establish file types and respective upload formats for the file types. In some cases, the criteria may configured (e.g. modified, created) by a user of the investigator device 110 by providing user input data via a user interface. The investigator device 110 then determines, according to the established criteria, whether the files in a target dataset are to be included in the MFI and in what upload format. The investigator device 110 then initiates a transfer of the MFI to the cloud server 130 via the connection 150a.

While FIG. 1 shows an embodiment in which the investigator device 110 connects to the target device 120, other variations are contemplated.

In an embodiment, the target device 120 may include a software tool running on the target device 120 and implementing one or more methods described herein. The investigator may, for example, connect a USB or similar device to the target device 120 and run the tool on the hard drive of the target device 120. In such an embodiment, it can be considered that the target device includes the investigator device 110 or a component thereof as the functionalities of the investigator device 110 may be operating or executing on the target device 120 itself.

In another embodiment, the investigator device 110 may include a cloud computing component which may perform processing including one or more steps of the methods described herein. The investigator device 110 may include a client device running a client software component for interacting with the cloud computing component.

The system 100 may automatically produce a standardized evidence report on any digital evidence collected from the target device. The report may have a standardized format. In some cases, the standardized format may be designed to meet certain legal or evidentiary requirements. For example, in order for the evidence collected to be admissible, the evidence may need to meet certain requirements or be collected or presented in a particular way. By generating a report in a standardized format that meets one or more such requirements, the report can be shared with prosecuting attorneys in a format that is most effective or useful.

The investigator device 110 may be a purpose-built machine designed specifically for collecting and reporting on digital evidence. The investigator device 110 may store and run a digital investigation application including computer-executable instructions that, when executed by a processor, cause the investigator device to capture and report on digital evidence.

The investigator device 110 may be controlled and operated by a frontline police officer, investigator, or the like. For example, investigator device 110 may be stored in a police cruiser for use by an officer in the field.

As discussed above, the investigator device 110 may include at least one server computer, desktop computer, notebook computer, tablet, PDA, smartphone, or another computing device.

The investigator device 110 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage or may be received from the Internet or other network 130.

The investigator device 110 may include an input device. The input device may include any device for entering information into investigator device 110. For example, input device may be a keyboard, keypad, cursor-control device, touchscreen, camera, digital pen, stylus, or microphone.

A display device of the investigator device 110 may include any type of device for presenting visual information. For example, display device may be a computer monitor, a flat-screen display, a projector or a display panel.

An output device of the investigator device 110 may include any type of device for presenting a hard copy of information, such as a printer for example. Output device may also include other types of output devices such as speakers, for example.

In some embodiments, investigator device 110 may include multiple of any one or more of processors, applications, software modules, second storage devices, network connections, input devices, output devices, and display devices.

Although investigator device 110 is described with various components, one skilled in the art will appreciate that the investigator device 110 may in some cases contain fewer, additional or different components. In addition, although aspects of an implementation of the investigator device 110 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the investigator device 110 and/or processor to perform a particular method.

Investigator device 110 can be described performing certain acts. It will be appreciated that any one or more of the embodiments of investigator device 110 may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

The system 100 may enable investigators to collect evidence needed to help to initiate forensic investigations in a timely manner in order to help victims of crimes or to prosecute perpetrators of crimes efficiently and effectively. The system 100 may help secure key evidence such as by quickly capturing and preserving digital evidence. The system 100 allows a user to obtain evidence when it is available to collect information needed to help investigations.

In another example, the system 100 may be used in a corporate network or data security context. A corporate network may suffer a security breach resulting in the presence of malware on the network and the minimal forensic image may focus on file types which suggest the presence of said malware.

Figure 2:
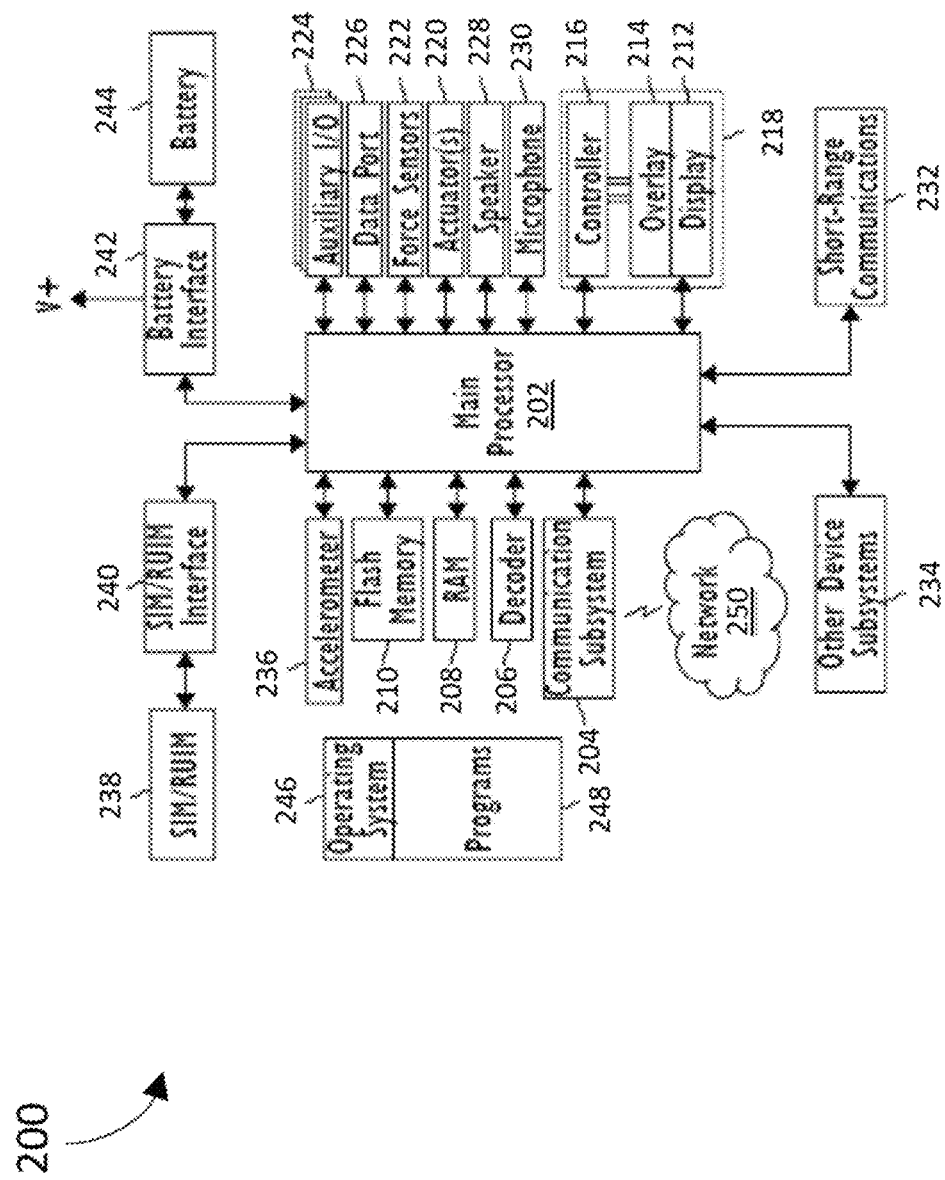
FIG. 2 is a block diagram of a computing device of FIG. 1, according to an embodiment.

FIG. 2 shows a simplified block diagram of components of a device 200, such as a mobile device or portable electronic device. The device 200 may be for example any of the devices shown or discussed in FIG. 1. The device 200 includes multiple components such as a processor 202 that controls the operations of the device 200. Communication functions, including data communications, voice communications, or both may be performed through a communication subsystem 204. Data received by the device 200 may be decompressed and decrypted by a decoder 206. The communication subsystem 204 may receive messages from and send messages to a wireless network 250.

The wireless network 250 may be any type of wireless network, including, but not limited to, data-centric wireless networks, voice-centric wireless networks, and dual-mode networks that support both voice and data communications.

The device 200 may be a battery-powered device and as shown includes a battery interface 242 for receiving one or more rechargeable batteries 244.

The processor 202 also interacts with additional subsystems such as a Random Access Memory (RAM) 208, a flash memory 210, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232 and other device subsystems 234.

In some embodiments, user-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a portable electronic device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access according to the present embodiment, the device 200 may use a Subscriber Identity Module or a Removable User Identity Module (SIM/RUIM) card 238 inserted into a SIM/RUIM interface 240 for communication with a network (such as the wireless network 250). Alternatively, user identification information may be programmed into the flash memory 210 or performed using other techniques.

The device 200 also includes an operating system 246 and software components 248 that are executed by the processor 202 and which may be stored in a persistent data storage device such as the flash memory 210. Additional applications may be loaded onto the device 200 through the wireless network 250, the auxiliary I/O subsystem 224, the data port 226, the short-range communications subsystem 232, or any other suitable device subsystem 234.

For example, in use, a received signal such as a text message, an e-mail message, web page download, or other data may be processed by the communication subsystem 204 and input to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the portable electronic device 200 may be similar. The speaker 228 may output audible information converted from electrical signals, and the microphone 230 may convert audible information into electrical signals for processing.

Figure 3:
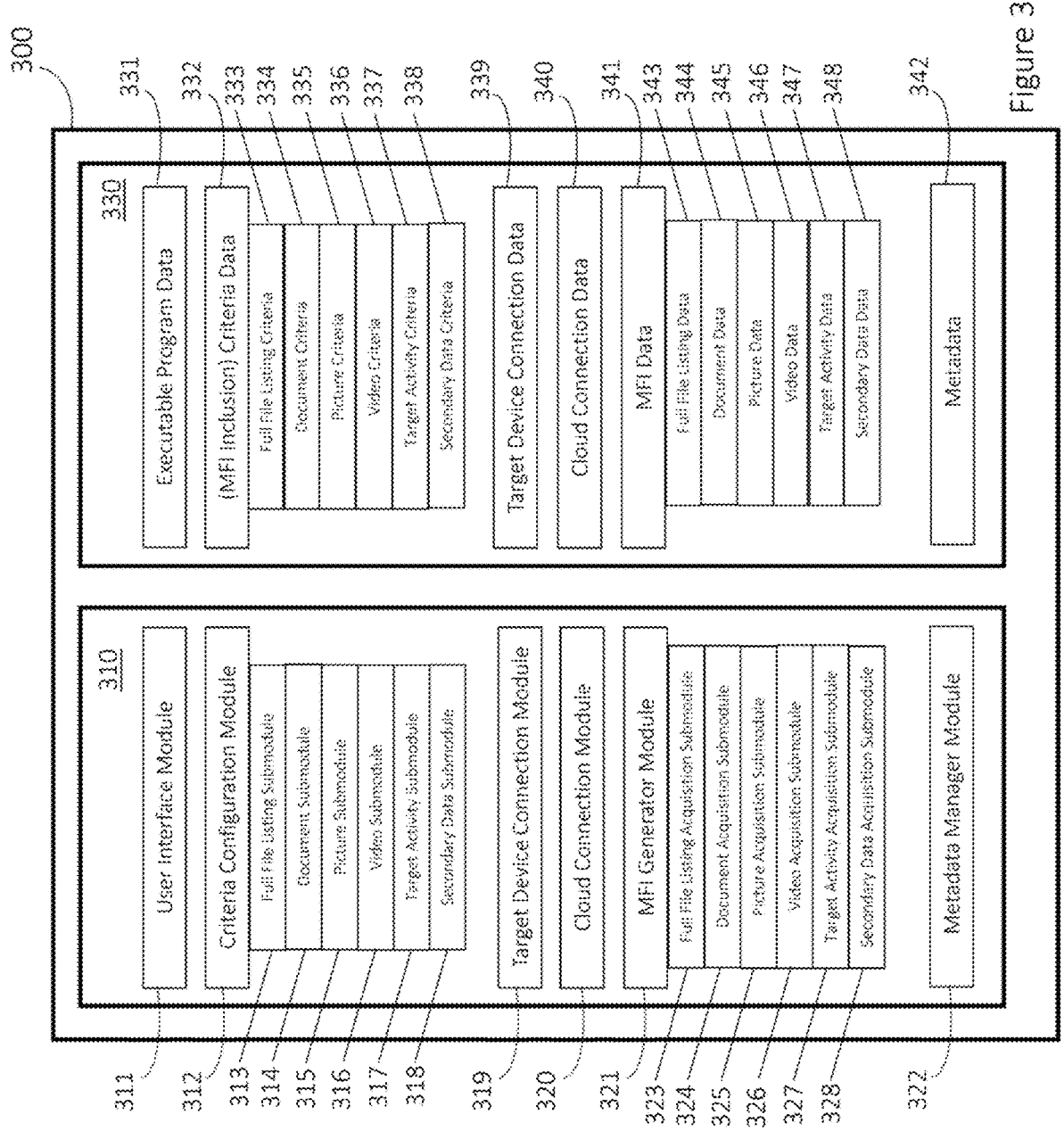
FIG. 3 is a block diagram of an investigator device for creating a minimal forensic image of a target dataset of a target device, according to an embodiment.

Referring now to FIG. 3, shown therein is a block diagram of an investigator device 300 for creating a minimal forensic image of a target dataset of a target device, according to an embodiment.

Investigator device 300 may be the investigator device 110 of FIG. 1.

The investigator device 300 includes a processor 310 and a memory 330. The processor 310 is communicatively connected to the memory 330. The investigator device 300 includes components beyond processor 310 and memory 330, such as an input device, a display, and an output device. The investigator device 300 is capable of connecting to a cloud device, such as the cloud server 130 of FIG. 1, to which the minimal forensic image can be transferred and stored.

In other embodiments the minimal forensic image may be transferred to and stored in a non-cloud storage device.

Memory 330 has instructions stored thereon which, upon execution by the processor 310, cause investigator device 300 to perform the functions discussed herein. In other embodiments, processor 310 may include more or fewer modules or submodules and memory 330 may comprise more or less data than described in the discussion of FIG. 3.

In other embodiments the investigator device 300 may comprise multiple computing devices and/or multiple processors.

The processor 310 includes a plurality of modules including a user interface module 311, a criteria configuration module 312, a target device connection module 319, a cloud connection module 320, an MFI generator module 321, and a metadata manager module 322.

The criteria configuration module 312 includes a full file listing submodule 313, a document submodule 314, a picture submodule 315, a video submodule 316, a target activity submodule 317, and a secondary data submodule 318.

The MFI generator module 321 includes a full file listing submodule 323, a document submodule 324, a picture submodule 325, a video submodule 326, a target activity submodule 327, and a secondary data submodule 328.

The memory 330 stores executable program data 331, criteria data 332, target device connection data 339, cloud connection data 340, MFI data 341, and metadata 342.

The criteria data 332 includes, but it not limited to, full file listing criteria 333, document criteria 334, picture criteria 335, video criteria 336, target activity criteria 337, and secondary data criteria 338.

The MFI data 341 includes, but is not limited to, full file listing data 343, document data 344, picture data 345, video data 346, target activity data 347, and secondary data 348. Generally, the MFI data 341 includes file representations of certain files and data elements of the target dataset collected from the target dataset according to the criteria 332.

The investigator device 300 may perform some of the methods and processes described herein automatically upon establishing a connection between the investigator device 300 and a target device. In other embodiments, a given module or modules may execute upon receiving a user input via a user interface. The investigator device 300 may function as follows.

The minimal forensic image is a reduced size or minimal representation of the target dataset. The minimal forensic image stores only those data elements and files which are predicted to be of the greatest initial value to initiating a digital forensic investigation in the cloud. The MFI may be a (digital) forensic container format. The forensic container format may be a standard or open forensic container format, such as AFF4-L. The MFI stores data and files and may be configured to manage metadata for target dataset files that are included (in whatever upload format) or not included in the MFI.

At a high level, the forensic container may function similarly to a .zip file or like container-type file format. The forensic container can hold other files and metadata describing the files contained therein. Metadata may include, for example, timestamps (e.g. created-on timestamp), file size, or cryptographic hashes of data or files contained in the forensic container. The forensic container may include a table of contents or the like within the forensic container indicating where to find the contents of the forensic container. In some cases, the investigator device 300 or cloud server may include software configured to read the data contained in the forensic container. The forensic container may include one or more integrity checks. These integrity checks may go beyond those that might be included in a standard or consumer container file such as a .zip. For example, the forensic container may hash or have some sort of CRC data for every block of data in the forensic container. This may help if there is file corruption or corrupted space on the drive, such as if the middle part of the container file is corrupted. The forensic container may include added tamper protection so if files contained in the forensic container or the table of contents were modified the hashes would be different and tampering could be identified.

Data and/or files which are known to not be of importance to the investigation, such as operating system files (e.g. Windows 10 operating file) are not uploaded. These files may be identified using hash sets. The hash sets may be hash sets from organizations such as the National Software Reference Library (NSRL).

A person of skill in the art will appreciate that any reference to a file or file type herein is not meant to limit the disclosure to only files but rather should be understood to also include data and data types that are not in the form of a file.

The instructions and data required to run the modules of processor 310 are found in executable program data 331 in memory 330.

The user interface module 311 provides a user interface which enables the user (hereafter investigator) of the investigator device 310 to interact with the various modules and software on the investigator device 300 to create the minimal forensic image of the target dataset of the target device. As well, the user interface module 311 may allow the investigator to interact with the acquired minimal forensic image and its associated data.

In some embodiments, the investigator may use the investigator device 300 or other computing device to interact with the cloud server storing the minimal forensic image. In either case, the device communicating with the cloud server may be considered a client device. For example, this may include software components executing on the client device and/or the cloud server enabling the user view, manage, process, and analyze the contents of the minimal forensic image.

The criteria configuration module 312 allows the investigator to configure a set of criteria which determines the file types of target data files that are to be acquired from the target dataset and the upload format of each file type. Configuring the set of criteria may include modifying an existing set of criteria or adding a new set of criteria. Each set of criteria may include a plurality of file types. For each of the plurality of file types the set of criteria may include at least one upload format for target data files of the file type. In cases where there is more than one upload format for a file type, for each respective upload format of a file type the set of criteria includes file parameters which determine the upload format for a given file of the file type.

In other embodiments, configuration of a set of criteria may not occur and an existing set of criteria stored in memory 330. That is, criteria configuration module 312 may not be required for an investigation where an existing set of criteria, which may be stored as criteria data 332, is used.

Each set of criteria may also assign a hierarchy to the plurality of file types that establishes an order in which file types are to be located and acquired. Where the amount of time to complete an investigation is limited or unknown it may be beneficial to assign this hierarchy so that files having a higher priority are acquired first.

Each set of criteria configured for an investigation is stored as criteria data 332 in memory 330. An investigator may choose to create a new set of criteria for their investigation or may choose an already created set of criteria from criteria data 332 to use for their investigation. The investigator may also choose to modify an existing set of criteria from criteria data 332 using the criteria configuration module 312.

In FIG. 3, criteria configuration module 312 submodule examples for a variety of data and file types which may be included in the plurality of file types of the set of criteria are shown.

Full file listing submodule 313 is configured to acquire a full file listing of the target dataset. A full file listing or complete file list of the target dataset provides context to the investigation by including such information as folder structure, file names, file paths, and other file metadata. In an embodiment, the full file listing includes metadata for all of the files in the target dataset. The criteria parameters associated with acquisition of the full file listing are stored under criteria data 332 in the memory 330 as full file listing criteria 333.

Document submodule 314 allows the investigator to establish the parameters for acquiring document files from the target dataset. For example, the document submodule 314 may include a threshold file size value at or under which a document file is be acquired in its entirety (i.e. a complete file representation or complete copy) and over which the document submodule 314 extracts text from the document file and generates a cryptographic hash of the document file. The file size threshold may fall within a range of 100 kb to 300 kb. In an embodiment, the file size threshold may be 100 kb. The cryptographic hash of the document file may be, for example, an MD5 or SHA1 hash. The criteria parameters used by the document submodule 314 to determine whether to store a given document file in the MFI and in what upload format are stored in the memory 330 as document file criteria 334.

Picture submodule 315 allows the investigator to establish the parameters for acquiring pictures from the target dataset. For example, the investigator may set a threshold file size value at or under which a picture file would be acquired in its entirety and over which the upload format of the picture file would be as a thumbnail of the picture as well as a cryptographic hash of the file. The file size threshold may fall within a range of 100 kb to 300 kb. An example file size threshold may be 100 kb. An example thumbnail size may be a 256 pixel thumbnail. An example of a cryptographic hash of the document file may be an MD5, SHA1, or PhotoDNA hash. The criteria parameters associated with the acquisition of picture files are stored under criteria data 332 in the memory 330 as picture criteria 335.

Video submodule 316 allows the investigator to establish the parameters for acquiring videos from the target dataset. For example, the investigator may set a threshold file size value at or under which a video file would be acquired in its entirety and over which the upload format of the video file would be as a subset of frames of the video as well as a cryptographic hash of the file. The file size threshold may be within a range of 1 MB to 2 MB. An example file size threshold may be 2 MB. The number of key frames of the video may be a set value (e.g. 30 frames) or a percentage of the total frames (i.e. every $n^{th}$ frame). An example of a cryptographic hash of the document file may be an MD5 or SHA1 hash. The criteria parameters associated with the acquisition of video files are stored under criteria data 332 in the memory 330 as video criteria 336.

Target activity submodule 317 allows the investigator to establish the parameters for acquiring data and/or files regarding the activity of the user (or users) and the system of the target device. For example, in a Microsoft operating system this information may include: registry hives, Jumplists, Link/shortcut ("lnk") files, Prefetch files, Windows Timeline data, event logs, SRUM data, the SetupApiLog file, AmCache data, Cortana data, etc. This information would also likely include internet browsing histories from all browsers on the device. As with the other file types discussed above the investigator may set different parameters which determine the upload format of the data and/or files associated with target user activity. The criteria parameters associated with the acquisition of video files are stored under criteria data 332 in the memory 330 as target activity criteria 337.

In some circumstances the chosen minimal forensic image, as determined by the investigator and the set of criteria, may be acquired in its entirety and there may yet be time or a need to acquire additional data. For example, in some investigations, such as criminal prosecution cases, it is required that a complete set of data (i.e. a true or complete forensic image of the target dataset) be acquired for reference or analysis. The investigator may use the secondary data submodule 318 to pre-determine which additional or secondary data (or files) is to be acquired, in what upload format the data should be acquired, and possibly in what order the data should be acquired. The criteria parameters associated with the acquisition of this secondary data are stored under criteria data 332 in the memory 330 as secondary data criteria 338. The criteria for secondary data acquisition may be set before the investigation has begun or may be set during or after acquisition of the initial minimal forensic image (as determined by the set of criteria).

In some investigations or embodiments, both a minimal forensic image and a complete forensic image may be generated by the investigator device 300. The investigator device 300 may be configured to prioritize the generation of the minimal forensic image over the generation of the complete forensic image. That is, the complete forensic image may only be generated once the minimal forensic image has been completely uploaded or the complete forensic image may only be uploaded when it does not reduce the upload speed/increase the upload time of the minimal forensic image. The investigator or user conducting the investigation may indicate via user input through a user interface that specific files are priority files within the complete forensic image and the investigator device, upon receiving the user input data, may be configured to prioritize the upload of the priority files over other files included in the complete forensic image (i.e. those files in the complete forensic image that have not been identified as priority).

Target device connection module 319 establishes a connection between the investigator device 300 and the target device. The investigator device may receive certain target device information from a user, for example via the user interface module 311, which enables the investigator device 300 to access the target device 120. The information used to establish a connection with the target device 120 is stored in memory 330 as target device connection data 339.

Cloud connection module 320 establishes a connection between the investigator device 300 and a cloud server 130 and between the target device 120 and a cloud server 130. The investigator device 300 may receive cloud server information via input data provided by a user via the user interface module 311, to the investigator device 300 which enables the investigator device 300 to communicatively connect with and access the cloud server as well as to enable transfer of data, such as the minimal forensic image, from the target device 120 to the cloud server 130. The information associated with connecting with the cloud server 130 is stored in memory 330 as cloud connection data 340.

The MFI generator module 321 identifies target data files for inclusion in the MFI by analyzing file metadata of the target dataset stored on the target device. The MFI generator module 321 generates a file representation of the target data file and stores the file representation in the MFI. The file representation may be a complete copy (i.e. a byte for byte copy of the file) or may be a reduced size representation. The reduced size representation may be a subset of the data in the file or a cryptographic hash of the file. In some cases, a reduced size representation of the file and a hash of the file may be generated by the MFI generator module 321 based on the set of criteria. The MFI generator module 321 is further configured to initiate a data transfer (i.e. upload) of the MFI to the cloud server (using cloud connection data 340) according to the set of criteria (criteria data 332).

The MFI generator module 321 executes instructions according to the set of criteria (from criteria data 332) to convert target data files to the respective upload formats. For example, the MFI generator module 321 may be configured to convert a picture file over 100 kb in size to a 256 pixel thumbnail. The MFI generator module 321 may determine a picture file size of the picture file, such as by analyzing file metadata of the picture file, and determine whether the file size is greater than 100 kb (size threshold). If the MFI generator module 321 determines the file size of the picture file is greater than the size threshold of 100 kb, the MFI generator module 321 generates a reduced size representation of the picture file (file representation), which in this case is a 256 pixel thumbnail, and stores the file representation in the MFI. Otherwise, the MFI generator module 321 may generate a complete copy of the picture file (file representation) and store the file representation in the MFI.

In FIG. 3, MFI generator module 321 submodule examples for a variety of data and file types which may be included in the plurality of file types of the set of criteria are shown.

The full file listing acquisition submodule 323 processes the full file listing based on the configured or chosen set of criteria from criteria data 332, specifically the full file listing criteria 333. Full file listing data 343 may be stored in memory 330 before being uploaded to the cloud server.

The document acquisition submodule 324 processes document files based on the configured or chosen set of criteria from criteria data 332, specifically document criteria 334. Document data 344 may be stored in memory 330 before being uploaded to the cloud server.

The picture acquisition submodule 325 processes picture files based on the configured or chosen set of criteria from criteria data 332, specifically picture criteria 335. Picture data 345 may be stored in memory 330 before being uploaded to the cloud server.

The video acquisition submodule 326 processes video files based on the configured or chosen set of criteria from criteria data 332, specifically video criteria 336. Video data 346 may be stored in memory 330 before being uploaded to the cloud server.

The target activity acquisition 327 processes target activity files and/or data based on the configured or chosen set of criteria from criteria data 332, specifically target activity criteria 337. Target activity data 347 may be stored in memory 330 before being uploaded to the cloud server.

The secondary data acquisition submodule 328 processes secondary data based on the configured or chosen set of criteria from criteria data 332, specifically secondary data criteria 338. Secondary data 348 may be stored in memory 330 before being uploaded to the cloud server.

Metadata manager module 322 generates and maintains a table of MFI contents or MFI content list. The table of contents includes metadata. The table of contents may be generated automatically by the metadata manager module 322. In some cases, the investigator may provide instructions to investigator device 300 using the metadata manager module 322 which instruct the investigator device 300 to create the table of contents comprising metadata of the data and/or files which compose the minimal forensic image.

The table of MFI contents lives within the minimal forensic image format. The table of MFI contents may include a record for each file representation included in the MFI. The record includes a file identifier (e.g. name) and an upload format or file representation format. The upload format indicates the format in which the file has been added to the MFI, and thus which format of the file is available in the cloud for analysis after transfer.

The table of MFI contents may render the minimal forensic image searchable by the investigator. The table of MFI contents may enable the investigator to see key information such as the upload format of a specific file or what important files or areas of the drive may be missing. For example, this metadata may inform the investigator for which critical files full copies are needed. The table of MFI contents provides the user with an ability to identify what is missing from the MFI (as compared to a complete forensic image) and bring those files or areas of the drive that have not been added to the cloud server at a manageable upload speed. This can be advantageous where the investigator decides they want the option of a byte for byte copy of a target dataset. The table of contents can be used to identify those data elements and files needed to make a byte for byte copy.

This metadata may also inform the secondary data acquisition strategy of the investigation where secondary data, as above, is data which was not predicted to be important enough to be included in the initial minimal forensic image but may still be valuable to the investigation and should be uploaded to the cloud server.

The metadata may be stored in the memory 330 as metadata 342. In other embodiments, the metadata may be stored in the cloud server.

In other embodiments, an evidence report may be created by the investigator device 300 after each minimal forensic image investigation is completed. In these embodiments, the investigator device 300 may include an evidence report module in processor 310 configured to generate a digital evidence report. The evidence report module may also allow the user to set the parameters for how the report is created, what is included in the report, where the report is sent, etc. Evidence report data may be stored in memory 330.

In other embodiments, the processor 310 of the investigator device 300 may include more or less submodules or modules and the memory 330 of the investigator device 300 may include more or less categories of data.

Figure 4:
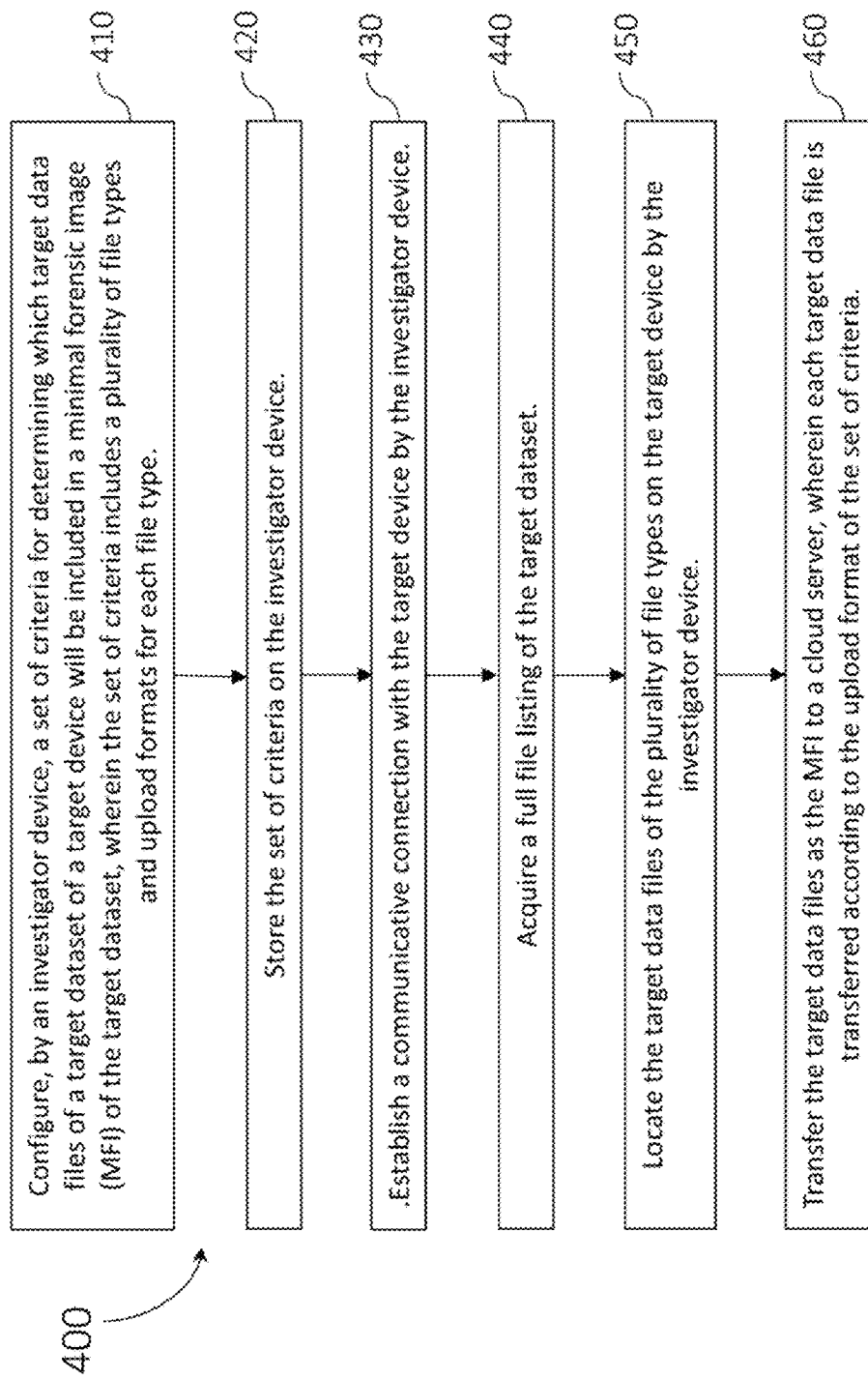
FIG. 4 is a flow diagram of a general method of creating a minimal forensic image of a target dataset of a target device, according to an embodiment.

FIG. 4 is a flow diagram of a method 400 of creating a minimal forensic image of a target dataset of a target device, according to an embodiment. Method 400 may represent a basic, general method for creating the minimal forensic image of the target dataset of the target device. The method 400 may be executed by the investigator device 300 of FIG. 3.

Method 400 refers to a single investigator device, however, it is to be understood that the investigator device may include multiple computing devices and various steps may occur on one or more of the computing devices of the investigator device.

The minimal forensic image represents a subset of the target dataset. The content of the subset is determined by a set of MFI inclusion criteria (herein also referred to as "set of criteria") stored in the investigator device. The criteria may be configured (e.g. modified or added to) by the investigator, such as through providing input data via a user interface of the investigator device, based on which file types are forensically relevant for the digital forensics investigation and particularly to the initiation of the digital forensics investigation (i.e. processing digital evidence). The minimal forensic image also includes metadata about the target dataset which provides context as well as possible evidence for the investigation.

It is to be understood that "target data files" and "file types" may refer to data and data types which are not in the form of files.

At 410, an investigator configures a set of criteria for determining which target data files of the target dataset are to be included in the minimal forensic image. The set of criteria includes a plurality of file types and at least one upload format for each respective file type. In some cases, the set of criteria may be pre-established and the investigator does not need to configure the set of criteria. Upload formats may include, for example, a complete copy or a reduced size representation. The reduced size representation may be a partial file (e.g. a subset of the file data) or a hash of the file. The actual representation of the file in the MFI regardless of upload format may be considered a file representation of the file.

Some of the file types may have only one upload format, for example, complete file, partial file, or cryptographic hash of file. Other file types of the plurality of file types may have more than one upload format. Whether a first or second upload format is used is determined by a characteristic of a respective target data file, such as file size. For example, a file type may have an associated threshold file size value at or below which the file may be uploaded completely, and above which the file may be uploaded as a partial file and/or in a modified format. A partial file may be, for example, a thumbnail of a picture, and a modified format may be, for example, as a cryptographic hash.

At 420, once the set of criteria is created it is stored on the investigator device. The set of criteria is stored as data in the memory of the investigator device. A single set of criteria can be used for multiple investigations or may be used at the basis for creating a new set of criteria for investigations. In some cases, step 410 may not be needed such as when the set of criteria is pre-established.

At 430, the investigator device establishes a communicative connection with the target device. This connection may be a wireless connection or may be a wired connection.

At 440, the investigator device accesses the target dataset of the target device and acquires a full file listing of the target dataset. The full file listing is stored in the MFI. The MFI may be a forensic container format. The forensic container format may be a standard or open forensic container format, such as AFF4-L or the like. The MFI is configured to store data and files and manage metadata for target dataset files (regardless of upload format and whether a given file has been included in the MFI or not). The full file listed can be transferred to a cloud server where the minimal forensic image is to be stored. The investigator device may also transfer the full file listing to the investigator device or to another storage device besides the cloud server. The full file listing (or complete file list) includes metadata regarding data and files of the target dataset and provides context for the investigation.

At 450, the investigator device locates within the target dataset the target data files of the plurality of file types as determined by the set of criteria for the investigation. This may include the investigator device scanning or reading metadata of the target dataset to determine a file type identifier for the files.

The investigator device may automatically scan the target dataset according to the established set of criteria. This may include reading through file system information. The set of criteria may include source location information identifying a file location on the target device, and automatically scanning the target dataset may include automatically retrieving and storing files from that location.

At 460, the MFI is transferred to a cloud server. The upload format of each target data file is determined by the set of criteria for the investigation. That is, as discussed above, some target data files will be uploaded in a complete copy while some target data files will be uploaded in a partial or reduced size format or a modified format (e.g. hash). As established in the set of criteria for the investigation, characteristics of the target data files, such as file type and/or file size, determine the upload format of each target data files and the manner in which the file representations of the files are stored in the MFI.

In some embodiments, at least some of the target data files in the MFI may be compressed before uploading.

The target data files may include any number of file or data types.

The MFI may include core system files. In such as case, the set of criteria is configured to include one or more core system file types which, when identified by the investigator device, can be added to and stored in the MFI in a respective upload format. Core system files are those system files that provide high value information regarding user-related activity or system-related activity. Core system files may include, for example, registry hives, event logs, AmCache data, or the like.

The MFI may include Internet browsing history files from one or more web browsers. In such a case, the set of criteria is configured to include one or more file types corresponding to Internet browsing history files. For example, Internet browsing history files may be included for browsers such as Chrome, Firefox, Internet Explorer, Edge, Safara, and Opera.

The MFI may include any one or more of document files (e.g. Word documents, PDFs, spreadsheets, etc.), picture files, video files, and audio files. Such files may be collectively referred to herein as "media files" and correspond to a respective "media file type".

The parameters of the set of criteria may include any number of specific file types or file locations. Those file or data types and locations which the criteria dictate are to be included in the MFI may depend on the specific investigation.

Examples of parameters which may be set by the criteria include file types, file locations, files that match a hash (e.g. from a set of reference hashes), files created/modified/accessed in a certain timeframe (i.e. file events), etc.

Reference hashes may be of operating system files or program application files which are likely not of interest to an investigation. Reference hashes may also be of previously scanned target files in the target dataset which have already been stored in the MFI and therefore are not to be included again. In some cases, a hash of a target file may be generated and automatically logged in the MFI along with respective location information. The generated hash may be compared to or checked against one or more reference hashes.

In some embodiments, upon completion of the creation of the minimal forensic image as determined by the set of criteria for the investigation, an upload of secondary data may occur. Secondary data is data from the target dataset that was not included in the MFI, such as by virtue of being a file type excluded from the MFI according to the criteria or being a file type for which a reduced size representation of the file was included in the MFI. The amount and type of secondary data targeted by the investigator device for upload may depend on the storage capacity of the cloud server (or other storage device) and on the time limits of the investigation.

In some embodiments, "a table of contents" (or "TOC") may be created. The TOC may be stored in the MFI. The TOC includes metadata of the data and/or files which have been stored in the minimal forensic image. This metadata may enable the investigator to see key information such as the upload format of a specific file or what important files or areas of the drive may be missing. For example, this metadata may inform the investigator for which critical files they should obtain full copies.

Figure 5:
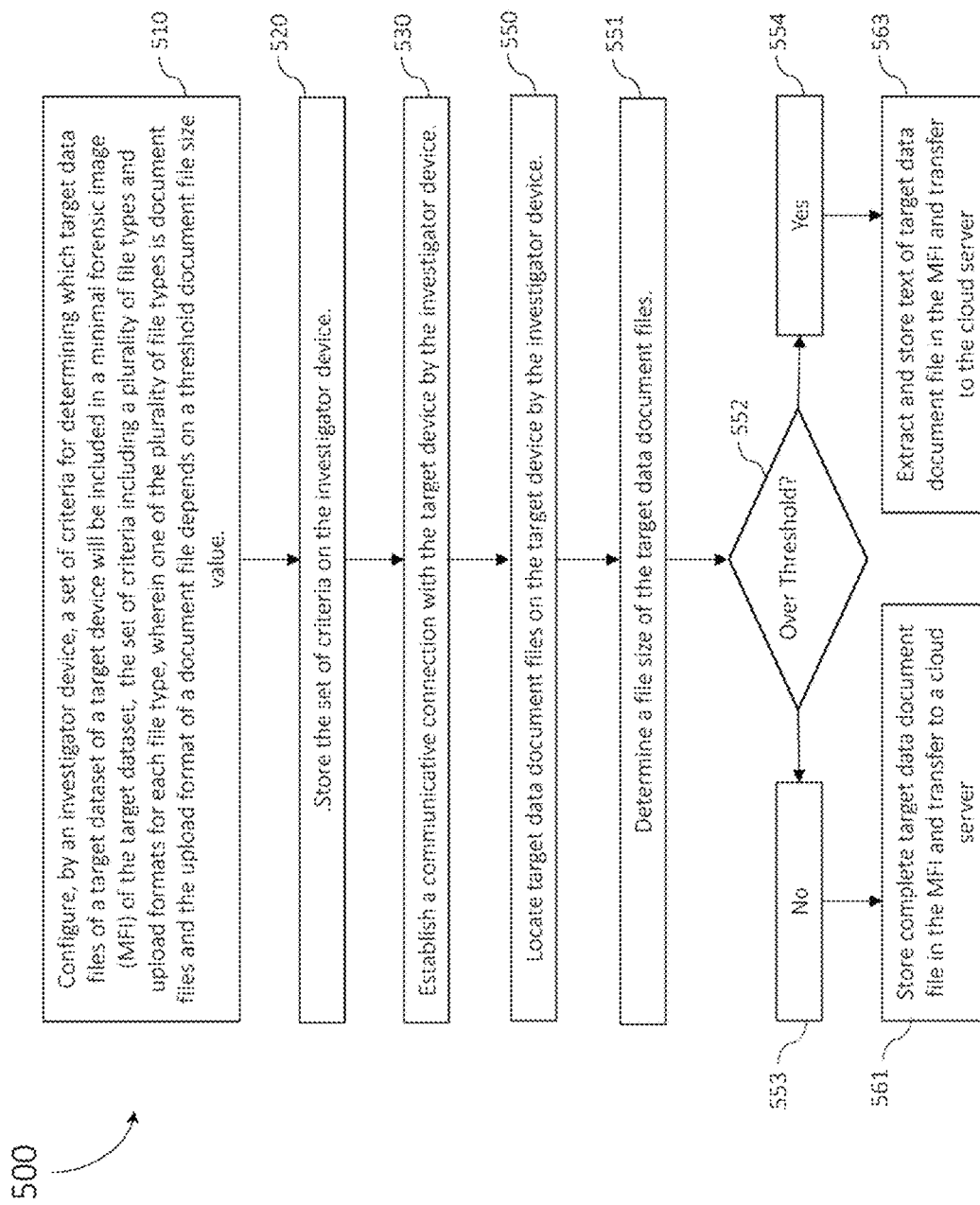
FIG. 5 is a flow diagram of a method of creating a minimal forensic image of a target dataset of a target device, wherein the minimal forensic image includes complete file or partial file uploads of document files, according to an embodiment.

Referring now to FIG. 5, shown therein is a flow diagram of a method 500 of creating a minimal forensic image of a target dataset of a target device, according to an embodiment. The method 500 includes complete file or partial file uploads of document files (i.e. document files having a document file type set out in the criteria). Method 500 is similar to method 400 but is specific to document files stored on the target device.

It is to be understood that although method 500 focuses on document files, other file types may be included in the minimal forensic image of method 500. For example, the full file listing discussed in method 400 may be included in the minimal forensic image of method 500.

At 510, an investigator configures a set of criteria for determining which target data files of the target dataset of the target device will be included in the minimal forensic image, wherein the set of criteria includes a plurality of file types and at least one upload format for each respective file type, and wherein one of the plurality of file types is document files (which may include one or more specific document file types) and the upload format of the document file depends on a threshold document file size value. In some cases, the set of criteria may be pre-established and the investigator does not need to configure the set of criteria.

That is, the upload format of a respective document file depends on the file size of the respective document file. An example threshold value for document file size may be 100 kb, wherein any document file of 100 kb or less is added and stored as a complete file representation or copy to the MFI (and eventually uploaded to a cloud server) and any document file having a file size greater than 100 kb is added to the MFI in a partial or reduced size representation format.

At 520, once the set of criteria is established, the set of criteria is stored on the investigator device. The set of criteria is stored as data in the memory of the investigator device. A single set of criteria can be used for multiple investigations or may be used at the basis for creating a new set of criteria for investigations.

At 530, the investigator device establishes a communicative connection with the target device. This connection may be a wireless connection or may be a wired connection.

At 550, the investigator device automatically scans the target dataset according to the established criteria. In doing so, the investigator device locates within the target dataset the target data files of the plurality of file types as determined by the set of criteria for the investigation. For method 500, the target data files of the target dataset include document files.

At 551, a file size of each respective document file is determined. This may include, for example, analyzing file size metadata of files in the target dataset having a document file type defined in the criteria.

At 552, the file size of each respective document file is compared to the threshold document file size value as established by the set of criteria of the investigation.

At 553, the investigator device determines a respective document file has a file size at or below the threshold document file size value.

At 561, the respective document file of 553 is stored in the MFI as a complete document file (and uploaded to the cloud server as such in the MFI). Although a single document file is discussed, it is to be understood that multiple document files may be at or below the threshold document file size value and therefore may be uploaded as complete files to the cloud server as part of the minimal forensic image.

At 554, the investigator device determines a respective document file has a file size above the threshold document file size value. As above, although a single document file is discussed, it is to be understood that multiple document files may be above the threshold document file size value.

At 563, the text of the respective document file of 554 is extracted and stored in the MFI (and uploaded to the cloud server as such in the MFI). Additionally, the investigator device may generate a cryptographic hash of the respective document file of 554 and store the hash in the MFI. In such a case, the text of the document file and a cryptographic hash of the document file is uploaded to the cloud server as part of the MFI.

Figure 6:
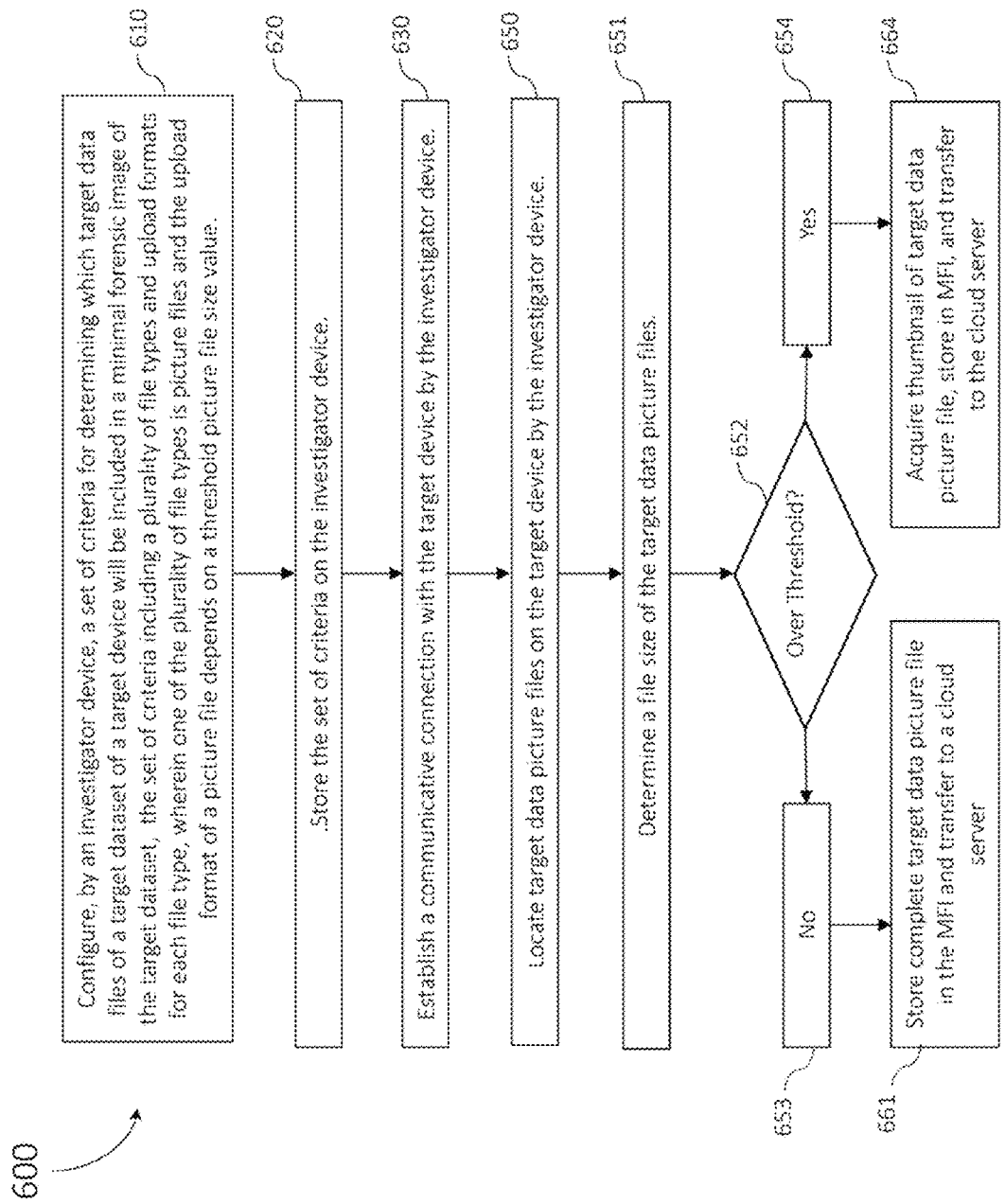
FIG. 6 is a flow diagram of a method of creating a minimal forensic image of a target dataset of a target device, wherein the minimal forensic image includes complete file or partial file uploads of picture files, according to an embodiment.

Referring now to FIG. 6, shown therein is a flow diagram of a method 600 of creating a minimal forensic image of a target dataset of a target device, wherein the minimal forensic image includes complete file or partial file uploads of picture files, according to an embodiment.

It is to be understood that although method 600 focuses on picture files, other file types may be included in the minimal forensic image of method 600. For example, a full file listing, such as discussed in method 400, may be included in the minimal forensic image of method 600.

At 610, an investigator configures a set of criteria for determining which target data files of the target dataset of the target device will be included in the minimal forensic image, wherein the set of criteria includes a plurality of file types and at least one upload format for each respective file type, and wherein one of the plurality of file types is a picture file type (which may include one or more specific picture file types) and the upload format of the picture file depends on a threshold picture file size value. In some cases, the set of criteria may be pre-established and the investigator does not need to configure the set of criteria (though he may have the ability to, such as through interacting with and providing input data to a user interface generated and presented on the investigator device).

That is, the upload format of a respective picture file stored in the MFI depends on the picture file size. An example threshold value for picture file size may be 100 kb, wherein any picture file of 100 kb or less is added and stored in the MFI in a complete file representation or copy, and any picture file greater than 100 kb is added to and stored in the MFI in a reduced size representation format (i.e. a partial format).

At 620, once the set of criteria is created it is stored on the investigator device. The set of criteria is stored as data in the memory of the investigator device. A single set of criteria can be used for multiple investigations or may be used at the basis for creating a new set of criteria for investigations.

At 630, the investigator device establishes a communicative connection with the target device. This connection may be a wireless connection or may be a wired connection.

At 650, the investigator device automatically scans the target dataset according to the established criteria. In doing so, the investigator device locates within the target dataset the target data files of the plurality of file types as determined by the set of criteria for the investigation. For method 500 the target data files of the target dataset include picture files.

At 651, a file size of each respective picture file is determined. This may include, for example, analyzing file size metadata of files in the target dataset having a picture file type defined in the criteria.

At 652, the file size of each respective picture file is compared to the threshold picture file size value as established by the chosen set of criteria of the investigation.

At 653, the investigator device determine a respective picture file has a file size at or below the threshold picture file size value.

At 661, the respective picture file of 653 is added to and stored in the MFI as a complete picture file (i.e. a complete file representation) to be uploaded to a cloud server in such format. Although a single picture file is discussed, it is to be understood that multiple picture files may be at or below the threshold picture file size value and therefore may be uploaded as complete files to the cloud server as part of the minimal forensic image.

At 654, the investigator device determines a respective picture file has a file size above the threshold picture file size value. As above, although a single picture file is discussed, it is to be understood that multiple picture files may be above the threshold picture file size value.

At 664, the investigator device captures a thumbnail of the respective picture file of 654 (i.e. a reduced size representation) and adds the thumbnail to the MFI to be uploaded to the cloud server. The thumbnail may be a 256 pixel representation of the respective picture file. Additionally, the investigator device may generate a cryptographic hash of the respective picture file of 654 and store the hash in the MFI for uploading to the cloud server.

Figure 7:
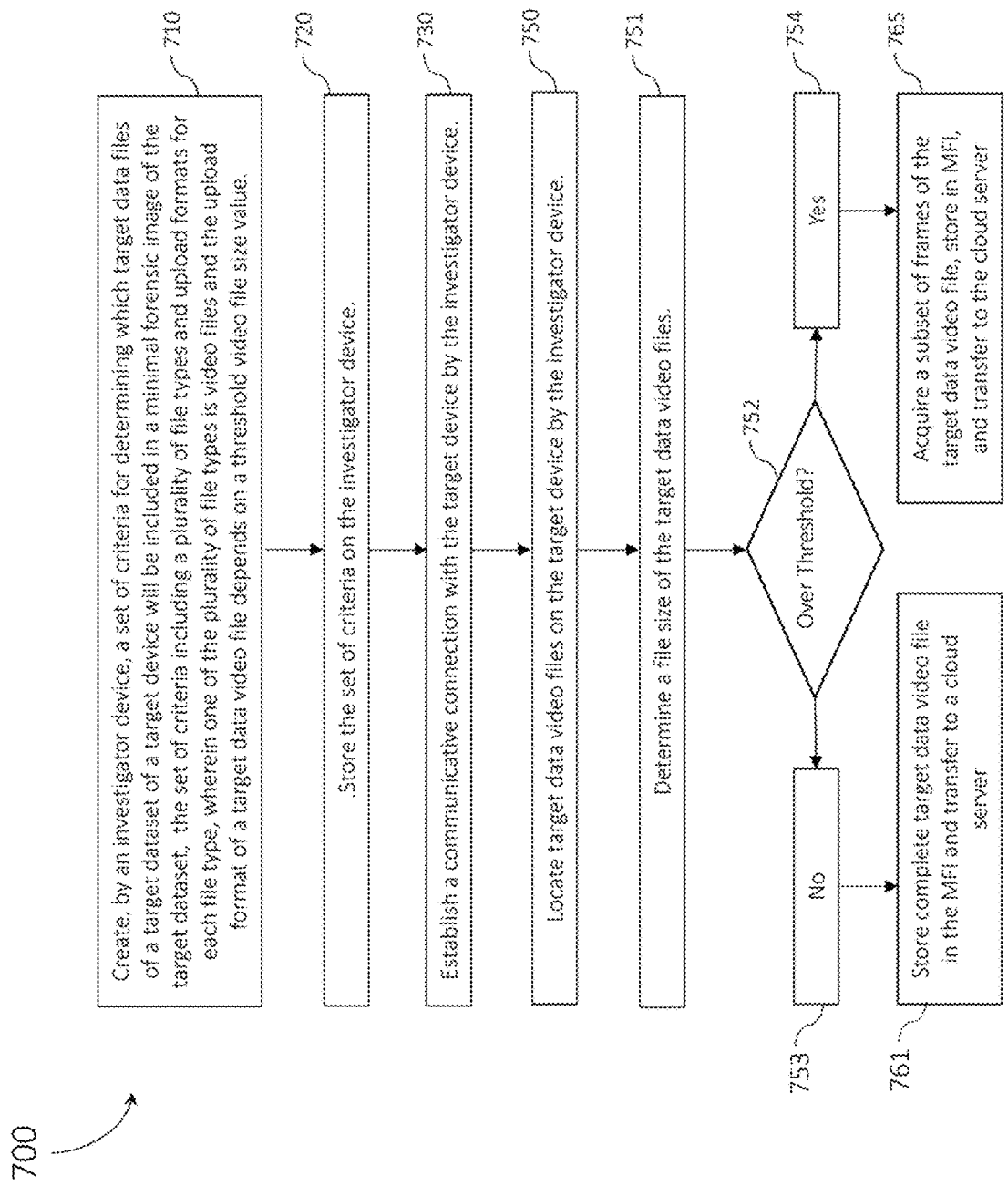
FIG. 7 is a flow diagram of a method of creating a minimal forensic image of a target dataset of a target device, wherein the minimal forensic image includes complete file or partial file uploads of video files, according to an embodiment.

Referring now to FIG. 7, shown therein is a flow diagram of a method 700 of creating a minimal forensic image of a target dataset of a target device, wherein the minimal forensic image includes complete file or partial file uploads of video files, according to an embodiment.

It is to be understood that although method 700 focuses on video files, other file types may be included in the minimal forensic image of method 700. For example, the full file listing discussed in method 400 may be included in the minimal forensic image of method 700.

At 710, an investigator configures a set of criteria for determining which target data files of the target dataset of the target device will be included in the minimal forensic image, wherein the set of criteria includes a plurality of file types and at least one upload format for each respective file type, and wherein one of the plurality of file types is video files (which may include one or more specific video file types) and the upload format of the video file depends on a threshold video file size value. In some cases, the set of criteria may be pre-established and the investigator does not need to configure the set of criteria (though he may have the ability to).

That is, the upload format of a respective video file depends on the file size of the respective video file. The file size threshold may fall within a range of 1 MB to 2 MB. An example threshold value for video file size may be 2 MB, wherein any video file of 2 MB or less is added to and stored in the MFI as a complete file representation and any video file greater than 2 MB is added to and stored in the MFI in a reduced size representation format (i.e. a partial format).

At 720, once the set of criteria is established it is stored on the investigator device. The set of criteria is stored as data in the memory of the investigator device. A single set of criteria can be used for multiple investigations or may be used at the basis for creating a new set of criteria for investigations.

At 730, the investigator device establishes a communicative connection with the target device. This connection may be a wireless connection or may be a wired connection.

At 750, the investigator device automatically scans the target dataset according to the established criteria. In doing so, the investigator device locates within the target dataset the target data files of the plurality of file types as determined by the set of criteria for the investigation. For method 700 the target data files of the target dataset include video files.

At 751, the investigator device determines a file size of each respective video file. This may include, for example, analyzing file size metadata of files in the target dataset having a video file type defined in the criteria.

At 752, the file size of each respective video file is compared to the threshold video file size value as established by the set of criteria of the investigation.

At 753, the investigator device determines a respective video file has a file size at or below the threshold video file size value.

At 761, the respective video file of 753 is added to the MFI as a complete file representation (i.e. complete video file), to be uploaded to a cloud server in such format as part of the MFI. Although a single video file is discussed, it is to be understood that multiple video files may be at or below the threshold video file size value and therefore may be uploaded as complete files to the cloud server as part of the minimal forensic image.

At 754, the investigator device determines a respective video file has a file size above the threshold video file size value. As above, although a single video file is discussed, it is to be understood that multiple video files may be above the threshold video file size value.

At 765, the investigator captures a subset of the frames in the video file ("key frames") as a reduced size representation of the video file and adds the reduced size representation to the MFI. The investigator device may use a video frame extractor program to capture the key frames. The key frames captured may be determined by a set number or may represent a percentage of the frames of the video (i.e. every $n^{th}$ frame is uploaded). Additionally, the investigator device may generate a cryptographic hash of the respective video file of 754 and add the hash of the video file to the MFI for upload to the cloud server.

Proof-of-concept testing of the systems and methods discussed herein has been performed and will now be described. The numbers and times provided below do not take into account any benefits that would be realized from compression. In testing, compression has yielded an additional 25-35% reduction in size across data types. Accordingly, in variations of the systems and methods described herein compression techniques may be used to further reduce the size of the MFI and further reduce upload time to the cloud server.

Dataset 1:
Dataset 1 (2 TB Hard Drive, 1.57 TB in Use)
  Number of Documents: 15,689
  Total Size: 16.7 GB
  Reduced MFI Size: 164 MB (99% reduction)
  Number of Pictures: 152,479
  Total Size: 23.3 GB
  Reduced MFI Size: 1.8 GB (92.25% reduction)
  Number of Videos: 7,969
  Total Size: 81.6 GB
  Reduced MFI Size: 820 MB (98.99% reduction)
  Core Operating System files/other files included: 7.39 GB
Total MFI Container Size: 10.17 GB (99.36% Overall Reduction from Full Dataset)

On a first target dataset comprising 1.57 TB, using a minimal forensic image approach to uploading resulted in a 10.17 GB minimal forensic image container size, a 99.36% reduction from the full dataset. Documents were reduced from 16.7 GB to 164 MB, pictures were reduced from 23.3 GB to 1.8 GB, and videos were reduced from 81.6 GB to 820 MB. The core operating system files and other files of interest comprised 7.39 GB. On a 10 Mbps connection the 10.17 GB minimal forensic image would take 2.5 hours to upload, and on a 100 Mbps connection it would take 15 minutes to upload. These times may be further reduced by compression of the data.

Dataset 2:
Dataset 2 (1 TB Hard Drive, 612 GB in Use)
  Number of Documents: 3,798
  Total Size: 289 MB
  Reduced MFI Size: 35.7 MB (87.63% reduction)
  Number of Pictures: 69,797
  Total Size: 69 GB
  Reduced MFI Size: 1.56 GB (97.73% reduction)
  Number of Videos: 4,962
  Total Size: 246 GB
  Reduced MFI Size: 2.21 GB (99.1% reduction)
  Core Operating System files/other files included: 3.29 GB
Total MFI Container Size: 7.42 GB (98.78% Overall Reduction from Full Dataset)

On a second target dataset comprising 612 GB, using a minimal forensic image approach to uploading resulted in a 7.42 GB minimal forensic image container size, a 98.78% reduction from the full dataset. Documents were reduced from 289 MB to 35.7 MB, pictures were reduced from 69 GB to 1.56 GB, and videos were reduced from 246 GB to 2.21 GB. The core operating system files and other files of interest comprised 3.29 GB. On a 10 Mbps connection the 7.42 GB minimal forensic image would take 1 hour and 50 minutes to upload, and on a 100 Mbps connection it would take 10 minutes to upload. These times may be further reduced by compression of the data.

While the above description provides examples of one or more apparatus, methods, or systems, it will be appreciated that other apparatus, methods, or systems may be within the scope of the claims as interpreted by one of skill in the art.

The invention claimed is:

1. A method of generating a minimal forensic image (MFI) of a target dataset stored on a target device to reduce upload demand and facilitate faster initiation of digital forensic investigation, the method comprising:
   storing a set of MFI inclusion criteria in memory, the set of MFI inclusion criteria including a plurality of file types and upload criteria for each file type, the upload criteria including an upload format indicating a format in which a file of the respective file type is to be added to the MFI;

automatically scanning the target dataset according to the set of MFI inclusion criteria to acquire target files matching the MFI inclusion criteria, wherein the scanning includes, for a plurality of target files in the target dataset:
generating a hash of a current target file of the plurality of target files;
comparing the hash to a set of reference hashes, wherein the set of reference hashes includes operating system file hashes, application program file hashes, and hashes of target files already added to the MFI;
when the hash of the current target file matches one of the set of reference hashes, omitting the current target file from the MFI; and
when the hash of the current target file does not match one of the set of reference hashes:
determining a file type identifier of the target file;
determining the upload format of the target file from the MFI inclusion criteria using the file type identifier, wherein determining the upload format of the target file comprises:
determining whether a file size of the target file exceeds a threshold file size;
if the file size exceeds the threshold file size, generating a reduced size representation of the target file and storing the reduced size representation of the target file in the MFI; and
if the file size does not exceed the threshold file size, storing the target file in a full file format in the MFI;
adding the hash of the current target file to the reference hashes; and
initiating a data transfer of the MFI to a cloud server.

2. The method of claim 1, wherein the MFI inclusion criteria further includes a file location, and wherein automatically scanning the target dataset according to the set of MFI inclusion criteria further includes identifying files in the target dataset at the file location and storing a file representation of each of the identified files from the file location in the MFI.

3. The method of claim 1, further comprising:
storing an MFI content list in the MFI; and
automatically generating a record in the MFI content list for each file representation in the MFI, the record including a file type identifier and the upload format.

4. The method of claim 1, wherein the MFI comprises a digital forensic container.

5. The method of claim 1, further comprising storing, in the MFI, metadata for each file in the target dataset, the metadata including at least a file type identifier and a file location on the target device.

6. The method of claim 1, wherein the target file is a media file and wherein generating the reduced size representation of the target file includes:
capturing a subset of media data in the media file; and
generating a hash of the target file.

7. The method of claim 1, wherein the reduced size representation includes a partial representation of the file and a hash of the file.

8. The method of claim 1, wherein the MFI inclusion criteria includes source location information identifying a file location on the target device, and wherein the method further comprises automatically retrieving and storing files from the file location.

9. A system for generating a minimal forensic image (MFI) of a target dataset of a target device to reduce upload demand, the system comprising:
a cloud server to store the minimal forensic image;
a target device including a memory storing a target dataset;
an investigator device including a processor communicatively coupled to a memory, the investigator device configured to:
store a set of criteria for determining which target data files of the target dataset will be included in the minimal forensic image, wherein the set of criteria includes a plurality of file types and at least a first upload format for each file type in the plurality of file types;
locate target data files of the plurality of file types in the target dataset using the set of criteria;
generate a hash of a current target file of the target data files of the plurality of file types;
comparing the hash to a set of reference hashes, wherein the set of reference hashes includes operating system file hashes, application program file hashes, and hashes of target files already added to the MFI;
when the hash of the current target file matches one of the set of reference hashes, omitting the current target file from the MFI;
when the hash of the current target file does not match one of the set of reference hashes:
adding the hash of the current target file to the reference hashes; and
transfer the target data files to the cloud server; wherein transferring the target data files includes:
determining a file type identifier of the target file;
determining the upload format of the target file from the MFI inclusion criteria using the file type identifier, wherein determining the upload format of the target file comprises:
determining whether a file size of the target file exceeds a threshold file size;
if the file size exceeds the threshold file size, generating a reduced size representation of the target file and storing the reduced size representation of the target file in the MFI; and
if the file size does not exceed the threshold file size, storing the target file in a full file format in the MFI;
uploading the minimal forensic image to the cloud server.

10. The system of claim 9, wherein at least one file type of the plurality of file types has at least a second upload format, and wherein which of the first upload format and the at least a second upload format is used in the minimal forensic image depends on a characteristic of the respective target data file.

11. The system of claim 9, wherein the investigator device is further configured to:
generate a content list of the transferred target data files including at least identifying information and the upload format of each target data file and storing the content list in the minimal forensic image; and
store in the MFI a full file listing of the target dataset of the target device, the full file listing including metadata for each file in the target dataset.

12. The method of claim 1 wherein the set of criteria further includes a hierarchy for the plurality of file types wherein target data files of at least a first file type of the plurality of file types are located and transferred before target data files of at least a second file type of the plurality of file types are located and transferred.

* * * * *